United States Patent [19]
Joyce et al.

[11] Patent Number: 5,148,533
[45] Date of Patent: Sep. 15, 1992

[54] APPARATUS AND METHOD FOR DATA GROUP COHERENCY IN A TIGHTLY COUPLED DATA PROCESSING SYSTEM WITH PLURAL EXECUTION AND DATA CACHE UNITS

[75] Inventors: Thomas F. Joyce, Westford; Robert C. Miller, Braintree, both of Mass.; Marc C. Vogt, Nashua, N.H.

[73] Assignee: Bull HN Information Systems Inc., Billerica, Mass.

[21] Appl. No.: 294,534

[22] Filed: Jan. 5, 1989

[51] Int. Cl.$^5$ .............................................. G06F 12/12
[52] U.S. Cl. ..................... 395/425; 364/229.2; 364/228.9; 364/283.2; 364/266.3; 364/DIG. 1; 395/600
[58] Field of Search ... 364/200 MS File, 900 MS File, 364/DIG. 1; 395/425

[56] References Cited
U.S. PATENT DOCUMENTS

| | | | |
|---|---|---|---|
| 4,045,781 | 8/1977 | Levy | 364/200 |
| 4,056,844 | 11/1977 | Izumi | 364/900 |
| 4,077,059 | 2/1978 | Cordi | 364/200 |
| 4,229,791 | 10/1980 | Levy | 364/200 |
| 4,349,871 | 9/1982 | Lary | 364/200 |
| 4,747,043 | 5/1988 | Rodman | 364/200 |
| 4,775,955 | 10/1988 | Liu | 364/900 |
| 4,811,215 | 3/1989 | Smith | 364/200 |
| 4,885,680 | 12/1989 | Anthony | 364/200 |
| 4,926,317 | 5/1990 | Wallach | 364/200 |
| 4,928,225 | 5/1990 | McCarthy | 364/200 |
| 4,939,641 | 7/1990 | Schwartz | 364/200 |
| 4,951,193 | 8/1990 | Muramatsu | 364/200 |
| 4,965,717 | 10/1990 | Cutts | 364/200 |

Primary Examiner—Thomas C. Lee
Assistant Examiner—Eric Coleman
Attorney, Agent, or Firm—William W. Holloway; Faith F. Driscoll; John S. Solakian

[57] ABSTRACT

In a data processing system having a plurality of tightly coupled data processing units connected by an asynchronous system bus, apparatus and an associated method are described for maintaining the coherency of data groups stored in instruction cache units and execution cache units. The apparatus includes a monitor unit as part of the bus interface unit, and a bus interface unit coupling each associated data processing unit to the system bus. The monitor unit receives signals, applied to the system bus, identifying data groups transferred between the memory unit and the data processing units, including those data groups originating from the bus interface unit of which the monitor unit is a component. The bus interface unit includes directories duplicating the contents of the instruction cache unit directory and the execution cache unit directory. The monitor unit, in response to signals applied to the system bus, identifies operations that can compromise the integrity of signals stored in the associated data processing unit. The monitor unit accesses the appropriate duplicate directory to determine if the address of a compromised data group validly exists in the duplicate directory. When an address is stored in the duplicate directory along with a valid signal, the valid signal is removed from both the cache directory and the duplicate directory.

20 Claims, 8 Drawing Sheets

APPARATUS AND METHOD FOR DATA GROUP COHERENCY IN A TIGHTLY COUPLED DATA PROCESSING SYSTEM WITH PLURAL EXECUTION AND DATA CACHE UNITS

BACKGROUND OF THE INVENTION

1. Field of the Invention

This invention relates generally to data processing systems and, more particularly, to data processing systems having a plurality of data processing units sharing common memory locations, data processing units typically referred to as being tightly coupled. The use of buffer or cache memory units associated with each data processing unit can result in the presence of a plurality of copies of a data group. Because each data processing unit has independent access to the data group, any copy of the data group can be changed by the associated data processing unit, rendering invalid the copies of the data group in other data processing units.

2. Description of the Related Art

Because of the increasing importance of tightly coupled data processing units to provide increased flexibility and computational power in data processing systems along with the almost universal use of cache memory units to enhance performance of data processing units, the problem of the coherency of the copies of the data groups has become increasingly important and several techniques for addressing the data group coherency problem have been disclosed. The general problem of coherency in cache memory units has been considered in the article "Implementing A Cache Consistency Protocol" by R. H. Katz et al (0149-7111/85/0000/0276), IEEE, 1985; "Competitive Snoopy Caching" by A. R. Karlin (Proceedings of the 27th Annual Symposium on the Foundations of Computer Science, IEEE, 1986) and "Synchronization, Coherence and Event Ordering in Multiprocessors" by M. Dubois et al (0018-9162/88/0200-0009, IEEE, 1988). In the article "Firefly: A Multiprocessor Workstation" by C. P. Thacker et al (0018-9340/88/0800-0909, IEEE, 1988), a coherency technique is described for a "write-back" cache protocol that involves a plurality of tag signals. In U.S. Pat. No. 4,228,503 invented by J. C. Waite et al, issued Oct. 14, 1980 and entitled "Multiplexed Directory for Dedicated Cache Memory System", each cache memory unit has access to all other cache units and can invalidate entries in the other cache units when the conditions are appropriate. In U.S. Pat. No. 4,322,795 invented by R. E. Lange et al, issued Mar. 30, 1982 and entitled "Cache Memory Utilizing Selective Clearing and Least Recently Used Updating", each central processing unit has associated therewith a cache memory and a duplicate directory. A system control unit controls the flow of data groups between the main memory unit and the cache memories. The system controller is coupled to each duplicate directory and, when conditions are appropriate, can invalidate data groups identified in the duplicate directory and, consequently, can invalidate entries in the associated cache memory. In U.S. Pat. No. 4,385,351 by T. Matsuura et al, issued May 24, 1983, and entitled "Multiprocessor System with Apparatus for Propagating Cache Buffer Invalidation Signals Around a Circular Loop", all the cache units are coupled in a loop, thereby permitting activity involving one cache unit to be communicated to all the other cache memory units for appropriate response. In U.S. Pat. No. 4,394,731 by F. O. Flusche et al, issued Jul. 19, 1983 and entitled "Cache Storage Line Shareability Control for a Multiprocessor System" and in U.S. Pat. No. 4,484,267 invented by R. P. Fletcher, issued Nov. 20, 1984 and entitled "Cache Sharing Control In A Multiprocessor", a system controller contains a duplicate directory of the data groups stored in cache memory units of associated processors. The system controllers are coupled (i.e., by the XI bus) and transfer status information relating to signal groups between system controllers. In addition, the disclosure involves store in cache units in which the current copy of a data group is not in the main memory, but in the associated cache unit. In addition, the operation of the invention involves novel status signals for the signal groups. In U.S. Pat. No. 4,410,944 invented by R. K. Kronies, issued Oct. 18, 1983 and entitled "Apparatus and Method for Maintaining Cache Memory Integrity in a Shared Memory Environment", each shared memory has monitoring and control capability for monitoring read and write requests and, under appropriate conditions, can invalidate the entries in the cache units. In U.S. Pat. No. 4,426,681 invented by P. C. A. Bacot et al, issued Jan. 17, 1984 and entitled "Process and Device for Managing the Conflicts Raised by Multiple Access to Same Cache Memory of a Digital Data Processing System Having Plural Processors, Each Having a Cache Memory", the conflicts described relate to conflicts resulting in simultaneous processing of a plurality of requests and not to conflicts in the coherency of a plurality of data groups in the data processing system. In U.S. Pat. No. 4,471,429 invented by M. G. Porter et al, issued Sept. 11, 1984 and entitled "Apparatus for Cache Clearing", a central processing unit having a cache unit, a system control unit, and a duplicate directory associated therewith is disclosed. Each system control unit is coupled to all the duplicate cache unit directories, all system controllers, and the main memory. All system control units receive information concerning activity involving the main memory and can, under appropriate conditions, interrogate the duplicate directory to determine when a selected signal group has been accessed When the selected signal group has been accessed, then the selected signal group in the cache unit is invalidated. In U.S. Pat. No. 4,622,631 invented by S. J. Frank, issued November 11, 1986 and entitled "Data Processing System Having a Data Coherence Solution", only one copy of a data group in a data processing system is described as the "correct" copy (i.e., designated in terms of current owner by the reference). Apparatus is provided for transferring the correct copy of the data group to a cache unit of a requesting central processing unit. In U.S. Pat. No. 4,747,043 invented by P. K. Rodman, issued on May 24, 1988 and entitled "Multiprocessor Cache Coherence System", a separate processor for identifying and storing information related to data group activity is described. The separate (cache coherence) processor provides an elaborate mechanism for enforcement of a data group coherency strategy In U.S. Pat. No. 4,755,930 invented by A. W. Wilson, Jr. et al, issued Jul. 5, 1988 and entitled "Hierarchical Cache Memory System and Method", a coherency system for a multi-level cache is described which can be used with a write-through (also referred to as the store through) or write delayed cache memory protocol However, no specific implementation is provided.

The data processing system in which the present invention is incorporated has data processing system units coupled to an asynchronous system bus along with a cache memory data group coherency protocol that is generally described as a store through cache memory strategy. The coherency apparatus and techniques described by the references generally involve a plurality of status signals, an increase in the number of conducting paths coupling the cache memory unit, an increase in apparatus or describe non-bus oriented systems in which system data group activity is more accessible.

A need has therefore been felt for apparatus and an associated method that can provide data group coherency in a bus oriented data processing system using a store through cache memory strategy which does not involve a plurality of status signal or require complex apparatus.

FEATURES OF THE INVENTION

It is an object of the present invention to provide an improved data processing system.

It is a feature of the present invention to provide an improved data processing system having a plurality of tightly coupled data processing units.

It is another feature of the present invention to provide apparatus for enforcing coherency of data groups in a bus oriented system.

It is yet another feature of the present invention to provide apparatus for data group coherency in a bus oriented data processing system employing a store through cache memory strategy.

It is a still further feature of the present invention to provide different strategies for the coherency of the instruction data groups and for coherency of the operand data groups.

SUMMARY OF THE INVENTION

The aforementioned and other features are accomplished attained, according to the present invention, by a bus oriented data processing system using a store through strategy for transferring data groups processed by a data processing unit to the main memory unit. The system bus is asynchronous and a bus interface unit is provided with each data processing unit to buffer the exchange of data groups between the system bus and the data processing unit. The bus interface unit includes duplicate directories of directories in the instruction (I-)cache unit and the execution (E-)cache unit along with apparatus for monitoring the system bus data groups, including the data groups exchanged with the bus interface unit of which the monitoring apparatus is a member. In response to data groups on the system bus indicating a memory reference operation, the monitoring apparatus will activate the appropriate duplicate cache directory unit to determine if the address data group associated in the memory reference operation is replicated in the duplicate directory. When an address data group is replicated along with an associated valid bit in the duplicate directory, the monitor unit causes the valid signal in both the duplicate cache directory unit and in the cache directory unit itself to be removed simultaneously. The storage of blocks of data groups (i.e., a block move), typically in response to an absence of a valid data group in the cache unit required by the associated data processing unit, into the cache storage unit causes a valid signal to be entered in both the cache directory unit and the duplicate cache directory unit locations associated with the address of the stored data groups.

These and other features of the invention will be understood upon reading of the following description along with the drawings.

DESCRIPTION OF THE PREFERRED EMBODIMENT

1. Detailed Description of the Figures

The present invention is adapted to function in a data processing unit in which certain types of instructions are executed by an earlier unit and dropped out of the production line while other types of instructions are executed at the end of the production line. The address unit of the data processing unit includes means for executing the instruction if it is a "non memory" instruction. The "non memory" instruction by having been executed is effectively dropped or removed from the production line and therefore requires no further activity by the production line, thereby improving the system throughput.

Figure 1:
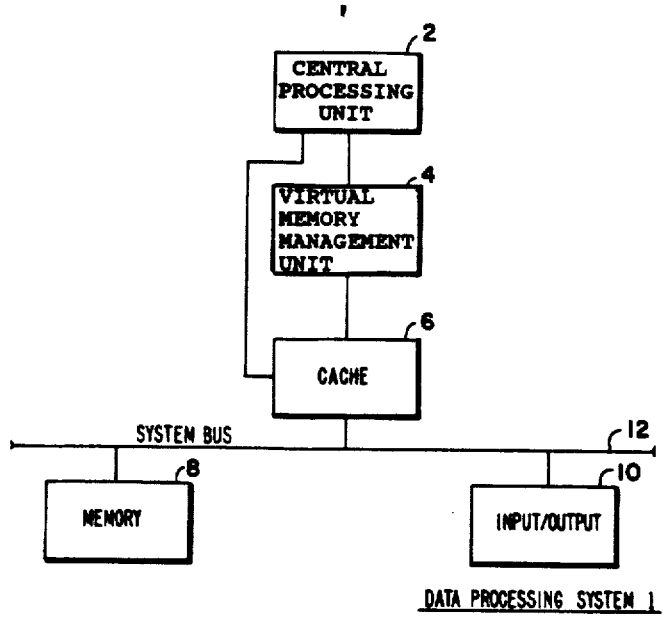
FIG. 1 is a block diagram of data processing system capable of advantageously using the apparatus of the present invention.

FIG. 1 shows a block diagram of a cycle production pipeline data processing system Included are a central processing unit (CPU) 2, a virtual memory management unit (VMMU) 4, a cache unit 6, a memory unit 8, and input/output peripheral unit 10. The cache unit 6, memory unit 8, and input/output peripheral unit 10 are all coupled in common to a system bus 12. The memory unit 8 stores instructions and operands. Those operands and instructions, having the highest probability of being executed immediately, are transferred to cache unit 6 from the memory subsystem 8.

The CPU 2 receives instructions from the cache unit 6 and in the execution of these instructions sends the virtual address portion of the instruction to VMMU 4. The VMMU 4 translates the virtual address into a physical address which is applied to cache unit 6 for fetching the necessary operands to allow the CPU 2 to execute the instructions.

The input/output unit 10 represents typically any number of peripheral controllers with their devices, or an input/output processor which controls peripheral controllers and devices, or it may represent typically a communications subsystem.

Figure 2:
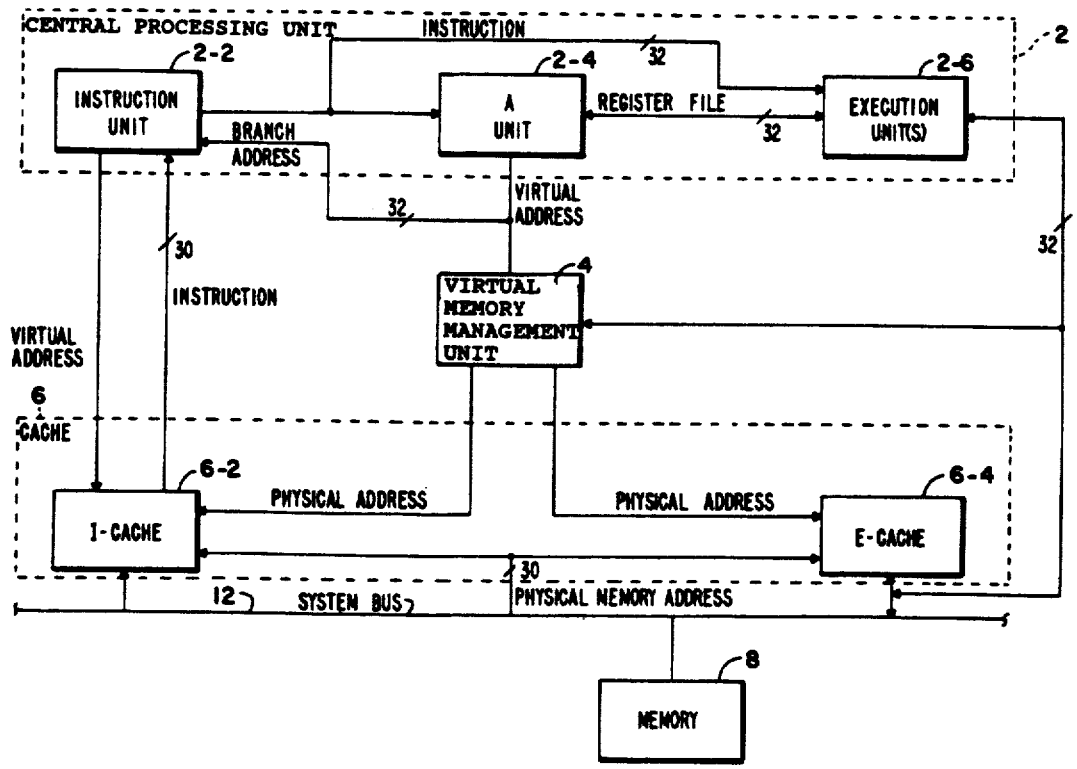
FIG. 2 is a more detailed block diagram of the data processing system of FIG. 1.

FIG. 2 shows in block diagram form the major elements that make up the CPU 2 and the cache unit 6. The CPU 2 includes an instruction (I) unit 2-2, an A unit 2-4, and a number of execution (E) units 2-6. The execution units 2-6 could be a scientific instruction processor or a commercial instruction processor. However, for simplicity of description, only the operation of one of the execution units 2-6 is described this description being sufficient to understand the invention.

The cache unit 6 includes an I-cache 6-2 and an E-cache 6-4. The I-cache 6-2 stores the instructions which are to be executed and the E-cache 6-4 stores the operands upon which the instructions operate. The I-unit 2-2 performs essentially two functions. It prefetches instructions from I-cache 6-2 and then cracks those instructions to determine how the other units, namely the A unit 2-4 and the E unit 2-6, will further process the instruction.

The A unit 2-4 receives the instruction from the I-unit 2-2 and executes the instruction if it is a register-to-register instruction or a branch instruction. When the instruction is to be executed by the E unit 2-6, the A unit 2-4 sends a virtual address to the VMMU 4 which translates it into a physical address for the E-cache unit 6-4. The E-cache 6-4 sends the operands to the E unit 2-6 for the completion of the execution of the instruction originally received by the instruction unit 2-2 from the I-cache unit 6-2.

The A unit 2-4 will also complete the execution of a branch instruction and send the branch address back to the instruction unit 2-2 so that it may request the next instruction at the location in I-cache 6-2 specified by the branch address. Both the A unit 2-4 and the E unit 2-6 include register files which store the contents of the registers which are accessible to the programmers, that is, so called software visible registers. Both the I-cache 6-2 and the E-cache 6-4 are coupled to system bus 12 and their contents are updated with instructions and operands received from memory unit 8.

Instructions are executed in a production pipeline fashion by the elements of CPU 2. That is, the I unit 2-2 receives an instruction from I-cache 6-2, cracks it, and then sends the instruction to the A unit 2-4. The A unit 2-4 either executes the instruction or sends the virtual address to the VMMU 4 for translation in order to address the E-cache 6-4. E-cache 6-4 sends the designated operands to the E unit 2-6.

While the A unit 2-4 is executing its portion of the first instruction from the I unit 2-2, the I unit 2-2 is fetching the second instruction and subsequent instructions from I-cache 6-2. When the A unit 2-4 sends the virtual address specified by the first instruction to the VMMU 4 and notifies the I unit 2-2 of that event, the I unit 2-2 sends the second instruction to the A unit 2-4. The VMMU 4 addresses the E-cache 6-4 while the A unit 2-4 is processing the second instruction in the pipeline. When the E unit 2-6 is executing the first instruction, the VMMU 4 may be addressing E-cache to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions being processed down the production line.

However, since the A unit 2-4 can execute certain software visible register instructions, they are removed from the production line as soon as the execution of those instructions is completed by the A unit. Similarly, when the A unit 2-4 is processing a branch instruction and the conditions of the branch are met, the A unit 2-4 immediately sends the branch address to the I unit 2-2 and that branch instruction will be removed from the production line. This mode and method of operation results in increased throughput as compared to the prior art.

Figure 3:
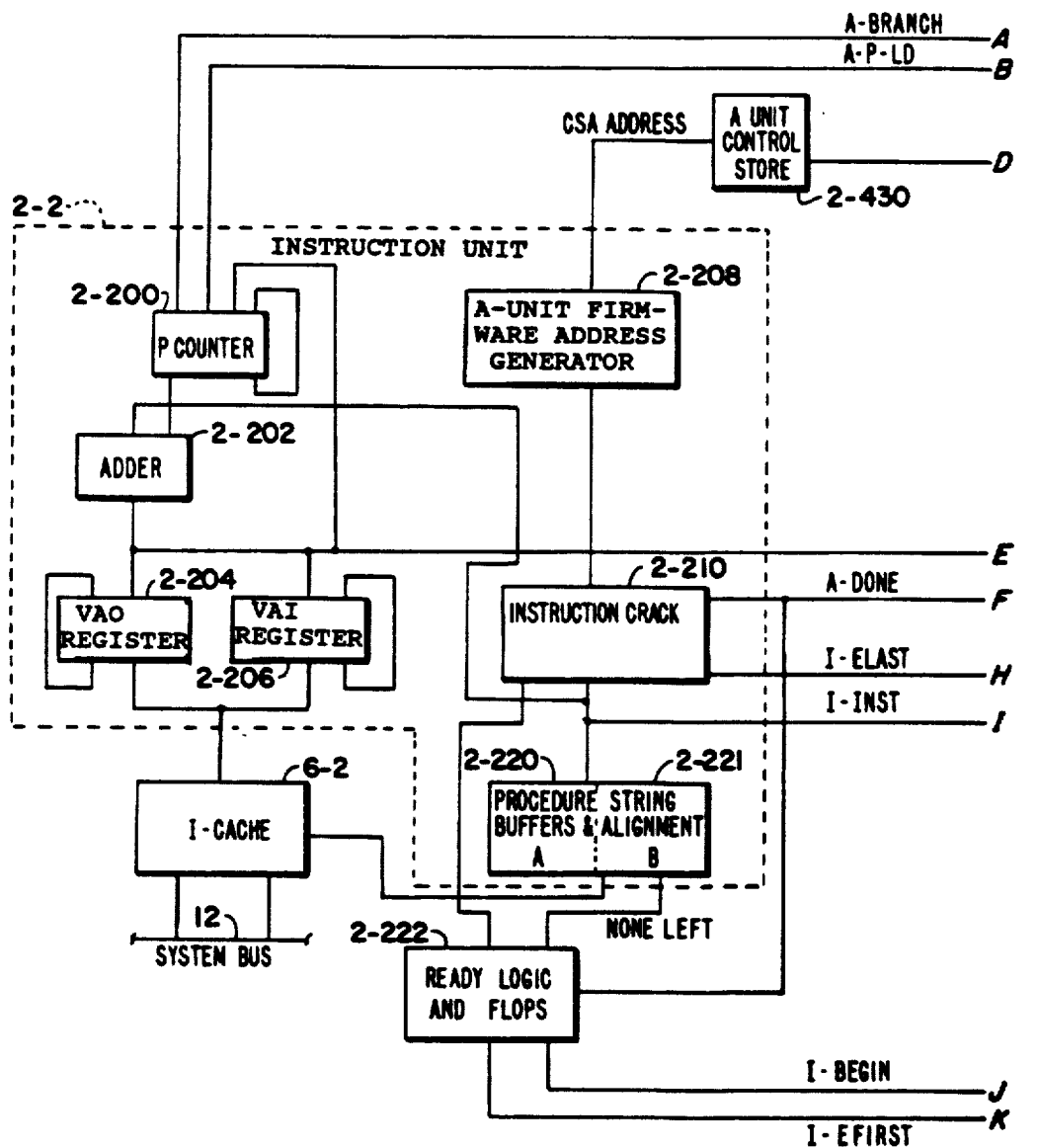
FIG. 3 sheets 1, 2 and 3 are logic block diagram of major elements of the production pipeline data processing unit.
Figure 3:
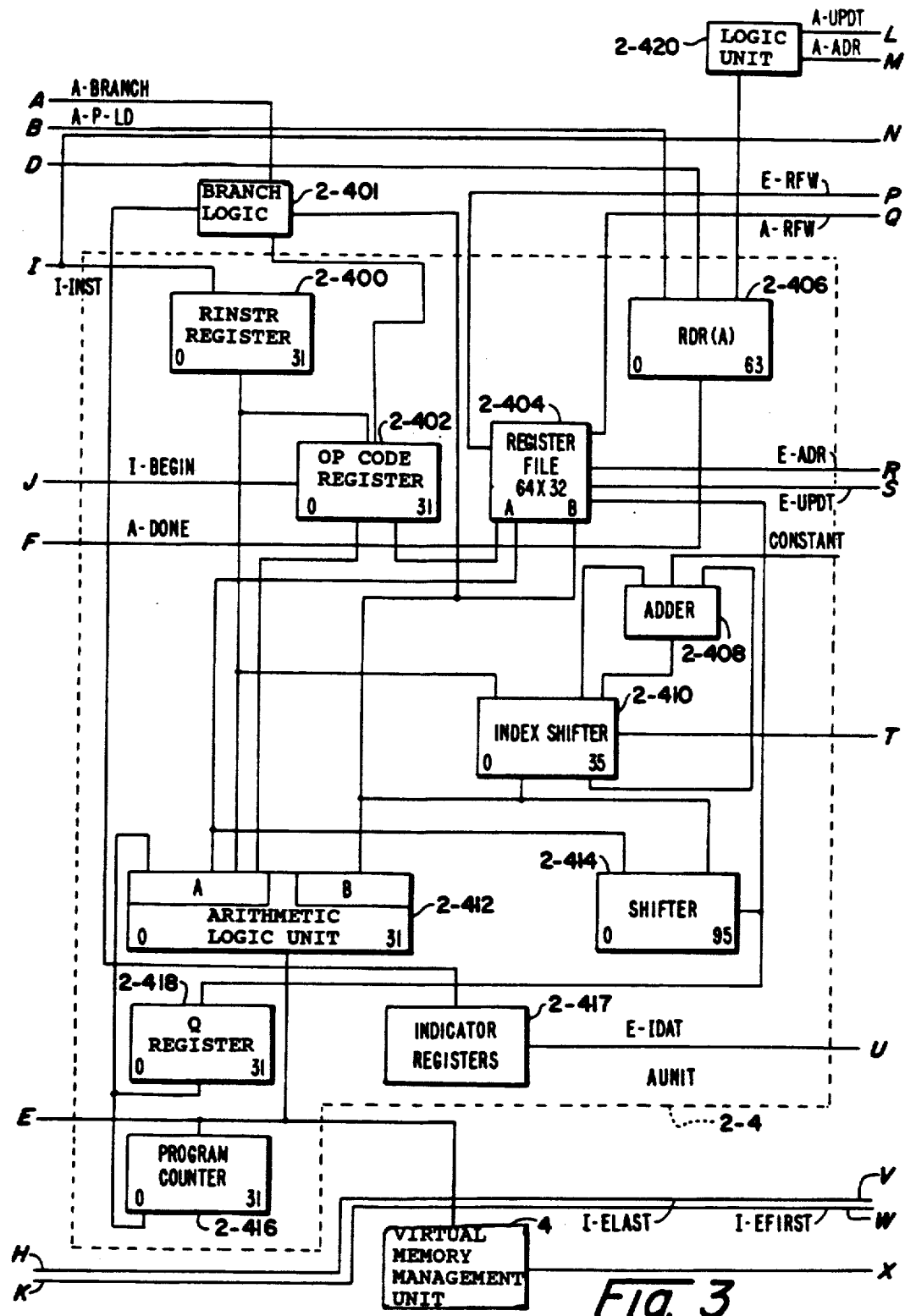
Figure 3:
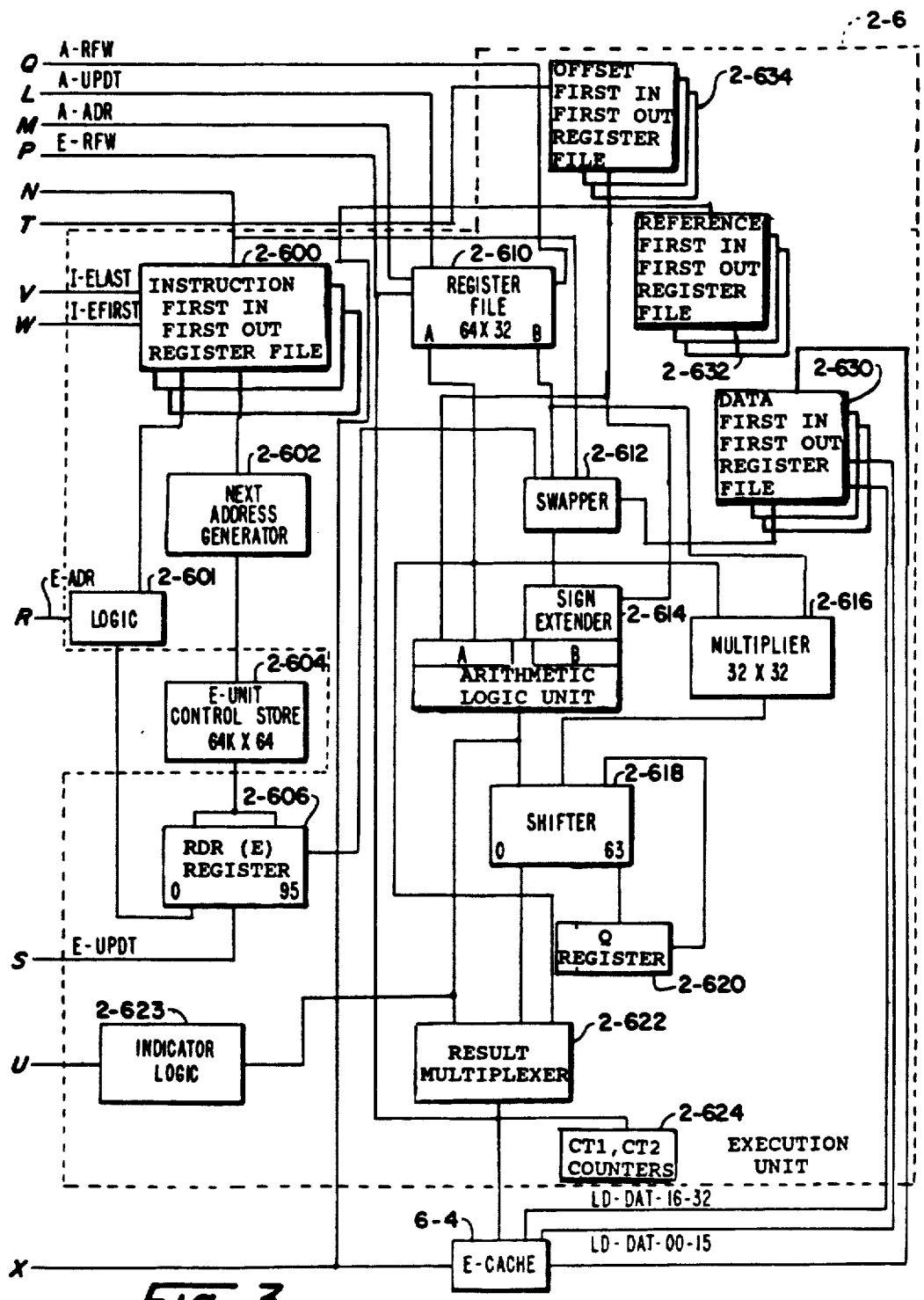

FIG. 3 shows in greater detail the elements of the instruction unit 2-2, the A unit 2-4, the execution unit 2-6 and their respective interconnections. The P-counter 2-200 of the instruction unit 2-2 is loaded by the A unit 2-4 with a virtual address. This virtual address is the address in I-cache 6-2 of the location of the next instruction that is to be placed into the pipeline. During an I-FETCH cycle, the virtual address is transferred to I-cache 6-2 via an adder 2-202 and either a register VA0 2-204 or a register VA1 2-206. Either register VA0 2-204 or register VA1 2-206 is used until a branch instruction is fetched. Then, if register VA0 2-204 is active, the address called for by the branch instruction would be stored in register VA1 2-206.

The reason the branch address is held separately in the VA0 2-204 and VA1 2-206 registers is because, if it is a conditional branch, the condition may or may not be met. If the condition is not met, then no branch will result. This gives the system the choice of either using or not using the address called for by the branch. The P counter 2-200, under firmware control, is incremented by one for one word instruction, incremented by two for a double word instruction, or replaced by a branch address.

The instruction is read out of I-cache 6-2 into either string buffers A 2-220 or string buffers B 2-221. Here again, one set of string buffers receives successive instructions from I-cache 6-2 until there is a branch instruction. Then the instruction following the branch instruction is stored in buffers in the other string. For example, if the string buffers A 2-220 were being used, then the instruction following the branch instructions would be stored in the string buffers B 2-221. The throughput is improved by storing both sets of instructions in case the branch conditions are met and the I unit 2-4 fetches the branch string from string buffers B 2-221.

The instruction is read out of I-cache 6-2 into either string buffers A 2-220 or string buffers B 2-221. Here again, one set of string buffers receives successive instructions from I-cache 6-2 until there is a branch instruction. Then the instruction following the branch instruction is stored in buffers in the other string. For example, if the string buffers A 2-220 were being used, then the instruction following the branch instructions would be stored in the string buffers B 2-221. The throughput is improved by storing both sets of instructions in case the branch conditions are met and the I unit 2-4 fetches the branch string from string buffers B 2-221.

The instruction is then sent to the instruction crack and resource control 2-210 which determines the kind of instruction it is. That is, if this is a software visible register to register instruction, then it will be executed by the A unit 2-4, if it is a memory instruction then it will be executed by the E unit 2-6.

The instruction is sent from the crack logic 2-210 to an A-unit firmware address generator 2-208 which addresses an A-unit control store 2-430. The contents of the addressed location are stored in an RDR (A) register 2-406 in the A unit 2-4. The instruction signals I INSTR 0-31 from the string buffers 2-220 or 2-221 are transferred to the instruction (RINSTR) register 2-400 in the A-unit 2-4. If the instruction is to be executed by the E unit 2-6, it is also stored in an instruction first in a first out register (FIFO) 2-600 in the E unit 2-6. The instruction is also stored in an OP-CODE register 2-402 in the A unit 2-4 under control of a signal I-BEGIN from the I unit 2-4. Both the RINSTR register 2-400 and the OP CODE register 2-402 store double words of 32 bits each. If an instruction requires 2 or 3 double words, then the OP CODE for that instruction remains in the OP CODE register 2-402 while each of the double words of the instruction in turn are stored in the instruction register 2-400.

The output of the OP CODE register 2-402 is used primarily for addressing a register file 2-404 under control of OP CODE and firmware bits stored in the OP CODE register 2-402 and the register RDR (A) 2-406, respectively. The register file 2-404 includes the software visible registers. If the instruction being executed is a memory instruction, then a virtual address is generated and sent to the VMMU 4 via an arithmetic logic unit (ALU) 2-412. Depending upon the instruction being executed by the A unit 2-6, the input to the ALU 2-412 may be applied to the A side, by the RINSTR register 2-400, the OP CODE register 2-402, the register file 2-404 or a program counter 2-416. ALU 2-412 B side inputs are provided by an index shifter 2-410 for index or offset operations, via an adder 2-408 or from register file 2-404. If this is a register instruction, for example, a shift operation of the contents of a software visible register in the register file 2-404, then the output of the register file 2-404 may be applied to the shifter 2-414, be shifted the number of bits specified by the instruction and stored back in the register file 2-404 in the same register from which it was read.

For the conditional branch instruction, signals from RINSTR 2-400 and from the ALU 2-412 are applied to branch logic 2-401. The output, load signal A-P-LD, enables the P counter 2-200 to accept the branch address signals A-BRANCH which are sent to I-CACHE 6-2.

When the A unit 2-4 has completed the execution of the instruction, an A-DONE signal is sent to the crack logic 2-210 of the I unit 2-2. This informs the I unit 2-2 to send the next instruction stored in the string buffers 2-220 or 2-221 to the A unit 2-4 and, if required, to the E unit 2-6. If an instruction calls for execution by the E unit 2-6, then the I unit 2-2 sends that instruction to the instruction FIFO 2-600 under control of signal I-E-LAST and signal I-E-FIRST. These signals control the loading of the instruction FIFO 2-600.

The I-BEGIN signal is received by the A unit 2-4 when the CRACK signal is generated, when the system is not in a hold mode, and when no logic block including the clock logic is in a stall mode.

The CRACK signal is generated when the ready logic and flops 2-222 is ready to crack the instruction, the string buffers A 2-220 or string buffers B 2-221 store at least one instruction, and the A unit 2-4 has generated the ADONE signal indicating that the A unit is available for processing the next instruction.

The I unit 2-2 generates the I-EFIRST and the I-ELAST signals by the ready logic and flops 2-222 if the instruction being cracked is to be executed by the E unit 2-6. Both signals are applied to the I FIFO 2-600. The I-EFIRST signal enables the I-FIFO 2-600 to store a double word instruction. The I-ELAST signal enables the I-FIFO 2-600 to store a single word instruction.

Note that the I unit 2-2 sends the instruction to be executed in the A unit 2-4, and only to FIFO 2-600 if the instruction is to be executed in the E unit 2-6. In the E unit 2-6, the next instruction the FIFO 2-600 will execute is applied to the next address generator 2-602 which generates the E unit control store 2-604 address location. The firmware word is stored in a register RDR (E) 2-606. The instruction FIFO 2-600 stores up to four instructions.

When the A unit 2-4 sends its virtual address to the VMMU 4, the VMMU 4 generates the physical address which addresses the E-cache 6-4. The contents of the addressed location are stored in a data FIFO 2-630 in the E unit 2-6 by signal LD-DATA-0015 for a single word transfer or signal LD-DATA 1631 for a double word transfer. Signal LD-DATA-0015 also increments by one the FIFO 2-630 write address to accept the second word of the transfer if the first word was not at an E-CACHE 6-4 word boundary. These data are the operands on which the instruction will operate. The E-unit 2-6 executes instructions whose operands are stored in software visible registers of register file 2-630. A typical instruction is the multiply instruction.

For this instruction, the A unit 2-4 generates a dummy cycle by sending the virtual address hexadecimal 40 to the VMMU 4. This results in the E-CACHE 6-4 generating a dummy cycle by sending signal LD-DATA 1631 to the FIFO 2-630 with a "dummy" operand.

If in the I unit 2-2, the instruction calls for a branch and has a displacement, then the displacement from the crack unit 2-210 is applied to the adder 2-202 to be added to the contents of the P counter 2-200 and stored in either register VA0 2-204 or register VA1 2-206 and applied to the I-cache 6-2.

A multiplier 2-616 is coupled to the A & B ports of register file 2-610 to generate and store partial products in conjunction with the shifter 2-618 and the Q-register 2-620. The partial products are applied to a result multiplexer (MUX) 2-622 and stored in accumulator location in register file 2-610. When the multiplication is completed, the final result is stored in one of the software visible registers of register file 2-610.

A swapper logic 2-612 receives operands from the B side of register file 2-610 for swapping words within double words and swapping bytes within single words. A 16-bit word is made up of two 8-bit bytes. A double word is made up of two 16-bit single words or four 8-bit bytes. A sign extender 2-614 repeats the sign of all the high order positions of a double word to the left of the first significant bit of the double word.

The CT1 and CT2 counters 2-624 are used in the calculation of the exponent of a floating point resultant. A mantissa of a floating point operand is processed through the ALU 2-608 and a shifter 2-618 in a conventional manner.

The software visible registers in both the register files 2-404 with A unit 2-4 and 2-610 in the E unit 2-6 are updated on successive cycles so that they both contain the same information. This is accomplished by firmware signals from register RDR (A) 2-406 which are applied to logic 2-420 to generate an update signal A-UPDT which enables the register file 2-610 and six A-ADR signals, the six A-ADR signals being applied to the address terminals of register file 2-610 to store the data from the D terminal of the register file 2-404 to the D terminal of register file 2-610. Similarly, the E-UPDT signal from register RDR (E) 2-606 enables register file 2-404 to store the data at the address specified by signals E-ADR from, logic 2-601. Logic 2-601 signals E-ADR are derived from instruction signals from the instruction FIFO 2-600 and firmware signals from RDR (E) 2-606.

The A unit 2-4 program counter 2-416 stores the address of the next instruction. P counter 2-200 in the I unit 2-2 also stores the address of the next instruction. The reason for the two registers is that, in case of a conditional branch, P counter 2-200 in the I unit 2-2 stores the branch address in case it is to be used, whereas the program counter 2-416 does not store the branch address, but stores the next address in the sequence presently being executed.

Figure 4:
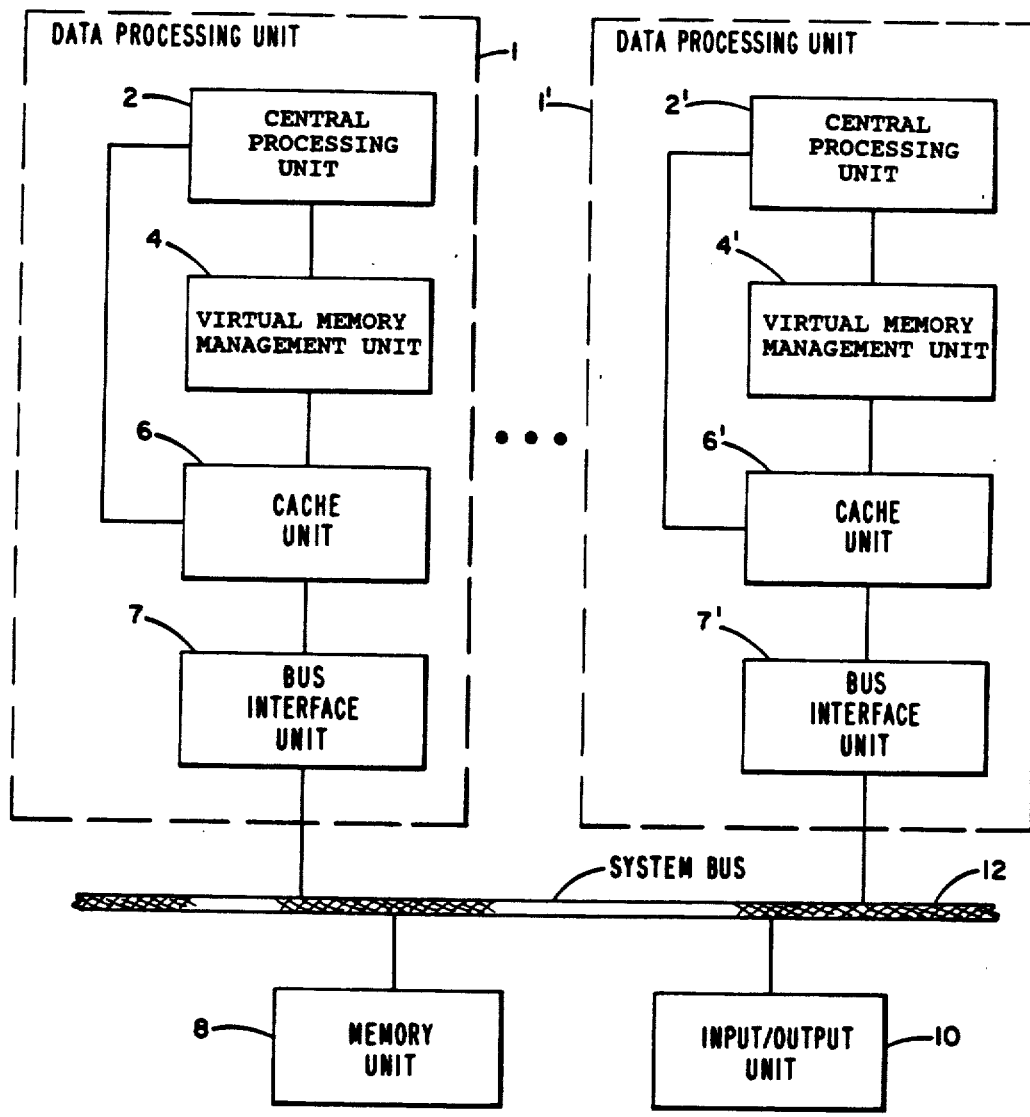
FIG. 4 is a block diagram of a data processing system having a plurality of tightly coupled data processing units.

Referring now to FIG. 4, the block diagram of the data processing system having a plurality of tightly coupled data processing units is shown. Each data processing unit, in addition to the central processing units 2 through 2', the virtual memory units 4 through 4' and the cache units 6 through 6', includes bus interface units 7 through 7'. The bus interface units 7-7' provide the buffering mechanism between the remainder of the associated data processing unit and the asynchronous bus 12. Also coupled to the bus 12 is a memory unit 8 and an input/output unit 10 as shown in FIG. 1.

Figure 5:
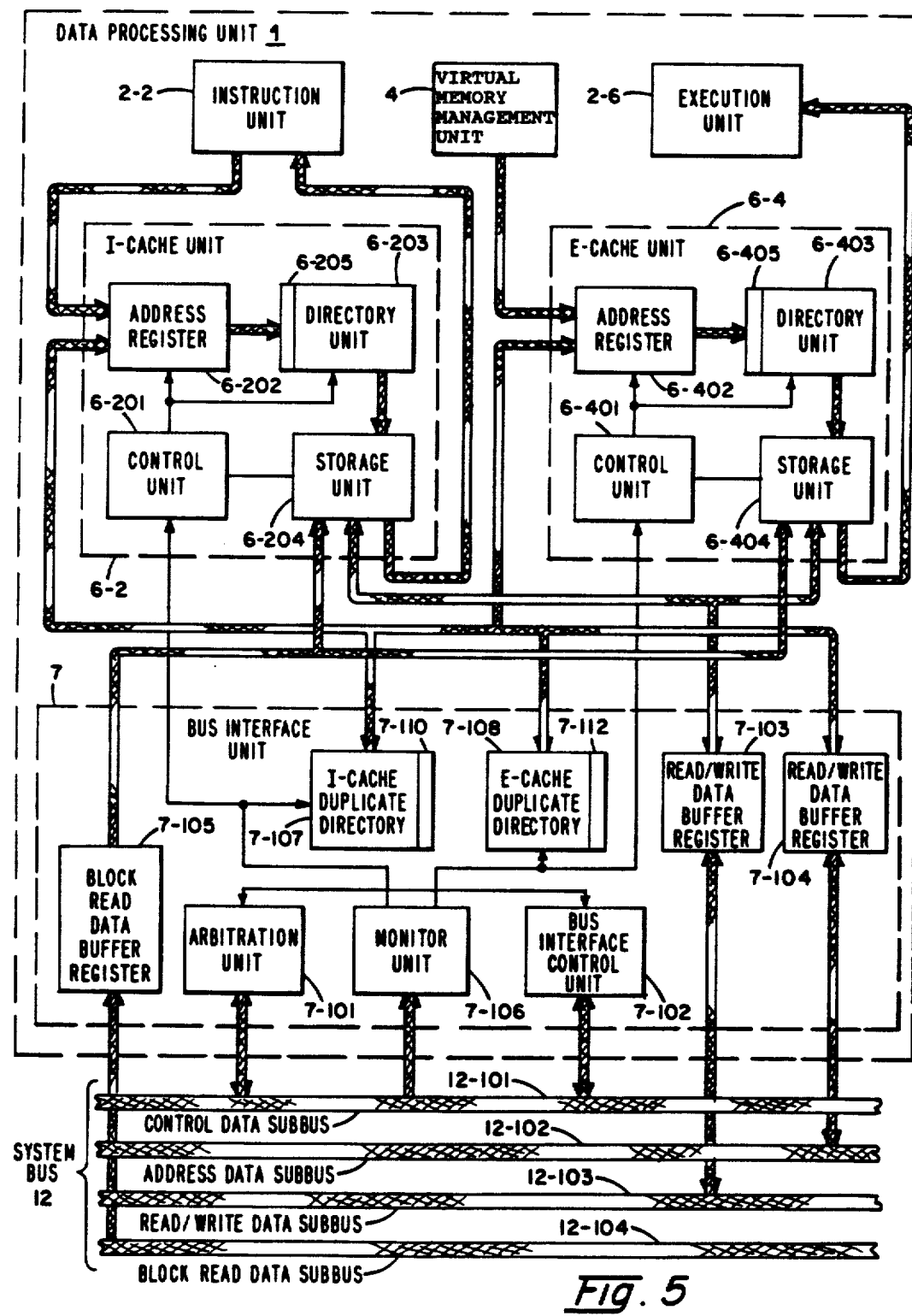
FIG. 5 is a block diagram of the components of the data processing system used in the present invention.

Referring next to FIG. 5, the components of the data processing units and the system bus 12, important to the present invention, are shown. In the preferred embodiment, the system bus 12 is organized into four subbuses according to the function thereof. The control data bus 12-101 transfers control signals that describe the operation to be performed on instruction or operand data groups identified by the address data bus 12-102. An address data group on the address data bus 12-102 can be used to identify an instruction or operand data group(s). For example, a data group applied to the control data bus 12-101 by a requesting data processor unit can indicate to the memory unit 8 that the data groups identified by the address of the address data bus 12-102 are to be retrieved from memory unit 8 and transferred to the requesting data processing unit. The read/write data bus 12-103 transfers identified data groups (instructions or operands) between the units coupled to the system bus. The block read data bus 12-104 is used to transfer blocks of data groups from the main memory to a cache unit when a request from the central processing unit determines that the required data is not stored in the associated cache unit (i.e., typically referred to as a "cache miss").

Buffering the transfer of data between the system bus 12 and the components of the data processing unit 1 is an associated bus interface unit 7. The bus interface unit 7 includes an arbitration unit 7-101 to permit the data processing unit 1 to couple to the system bus 12 in the presence of potentially conflicting requirements by other data processing units coupled to the system bus. In the preferred embodiment, each data processing unit has an arbitration unit 7-101 associated therewith that is controlled by an algorithm similar to the algorithm controlling the other arbitration units. Therefore, any conflicting attempts for access to the system bus 12 will provide the same conditions for the resolution algorithm controlling each arbitration unit resulting in the same conflict resolution by each of the arbitration units. The components of the bus interface unit 7 operate under control of the control unit 7-102. The bus interface control unit 7-102 exchanges control signals with the I-cache control unit 6-201, the E-cache control unit 6-401 and the control data bus 12-101. For purposes of the present invention, the bus interface unit 7 includes address data bus buffer registers 7-103 for temporarily holding the address groups to be applied to, or to be received from, the address data bus. Similarly, the read/write data bus 12-103 has read/write data bus buffer registers 7-104 for temporarily storing data groups being exchanged with the read/write data bus 12-103. The block read data buffer register 7-105 provides a temporary storage for blocks of data being transferred from the main memory unit 8 to the appropriate cache memory unit. The bus interface unit 7 also includes the bus interface monitor unit 7-106 which receives signals applied to the control data bus 12-101 and the address data bus 12-102. The monitor unit 7-106 is coupled to the I-cache duplicate directory 7-107 and the E-cache duplicate directory 7-108. The monitor unit 7-106 can compare an address from the address data bus with the addresses contained in the E-cache duplicate directory 7-108 or the I-cache duplicate directory 7-107.

The I-cache unit 6-2 includes a control unit 6-201 for controlling the operation of the I-cache unit 6-2 in response to applied signal groups, an address register 6-202 for storing the address containing the instruction requested by the instruction unit 2-2, a directory unit 6-203 for storing addresses, and a storage unit 6-204 for storing operands at a location associated with an address stored in the directory unit 6-203. Similarly, the E-cache unit 6-4 includes a control unit 6-401, an address register 6-402, a directory unit 6-403, and a storage unit 6-404 for storing operands required by the execution unit 2-6. The virtual memory management unit 4 applies real addresses to the E-cache address register 6-402 and to the address data buffer register 7-104, while the instruction unit 2-2 applies addresses to the I-cache unit address register 6-202. The address data buffer register 7-104 applies addresses to the I-cache address register 6-202 and the E-cache address register 6-402.

Each of the cache directories has a subdirectory associated with each directory location. In the preferred embodiment, this subdirectory is a bit position for storing a "valid" bit, the valid bit designating to the associated unit whether the associated group of instructions or operands should be used by the data processing unit. I-cache subdirectory unit 6-205 is associated with I-cache directory unit 6-203; E-cache subdirectory unit 6-405 is associated with E-cache directory unit 6-403; I-cache duplicate subdirectory unit 7-110 is associated with I-cache duplicate directory unit 7-107; and E-cache duplicate subdirectory 7-112 is associated with E-cache duplicate directory 7-108.

When the instruction unit 2-2 or the execution unit 2-6 requires an instruction or operand from the associated cache unit, an address data group is entered in the associated cache unit address unit and related control signals are applied to the associated control unit. The control unit determines whether the address data group of the required instruction or operand data group is stored in the directory unit and the status of the valid bit position. When the address data group is present and the address data group has a valid signal in the valid bit position, the instruction or operand data group in the corresponding location in the storage unit is forwarded to the requesting central processing unit. When the address data group is not present and/or the valid signal is not present in the valid bit position, then the real address of the requested instruction or operand data group is forwarded to the address data buffer register 7-104 and the control signals applied to the bus interface control unit 7-102. The bus interface control unit 7-102 applies control signals to the system bus requesting a memory read operation. After resolution of conflicts (by the arbitration units), the read request signals are applied to the system bus along with the (real) address of the requested data group. After retrieving the requested data group(s) from the memory unit 8, the memory unit 8 transfers the data groups through the block read data buffer register 7-105 and, under control of the bus interface control unit, the data groups are entered in the associated storage unit at an appropriate location. The associated location in the directory unit has the data group address data group identified and this address data group is also stored in the duplicate directory.

The monitor unit 7-106 receives system bus control signals and address data groups applied to the system bus 12, including the signals transmitted by the bus interface unit 7 of which the monitor unit 7-106 is a component. The paths illustrated in FIG. 5 are meant to be representative of the operation of the components and not an accurate depiction of these circuit paths. For example, as will be clear to those skilled in the art of cache memory units, the operation thereof is more complex, involving comparators, etc. The coupling of the control unit and the clock signal paths are also omitted in order to emphasize the functional relationships between the illustrated components.

The cache units, in response to an address data group and control signals applied thereto, causes a valid signal associated with the address data group to be removed from the cache directory unit, rendering the associated operand or instruction signal group inaccessible to the associated central processing unit. Because of the critical importance of the data group integrity, the removal of the valid signal has the highest priority. Similarly, the valid signal in a cache duplicate directory can be removed by the application of the associated address data group and appropriate control signals thereto. Similarly, an address data group and control signals applied to a cache unit and the associated cache directory result in the address and a valid signal entered therein (a data group being stored in the associated location in the cache storage unit).

Figure 6:
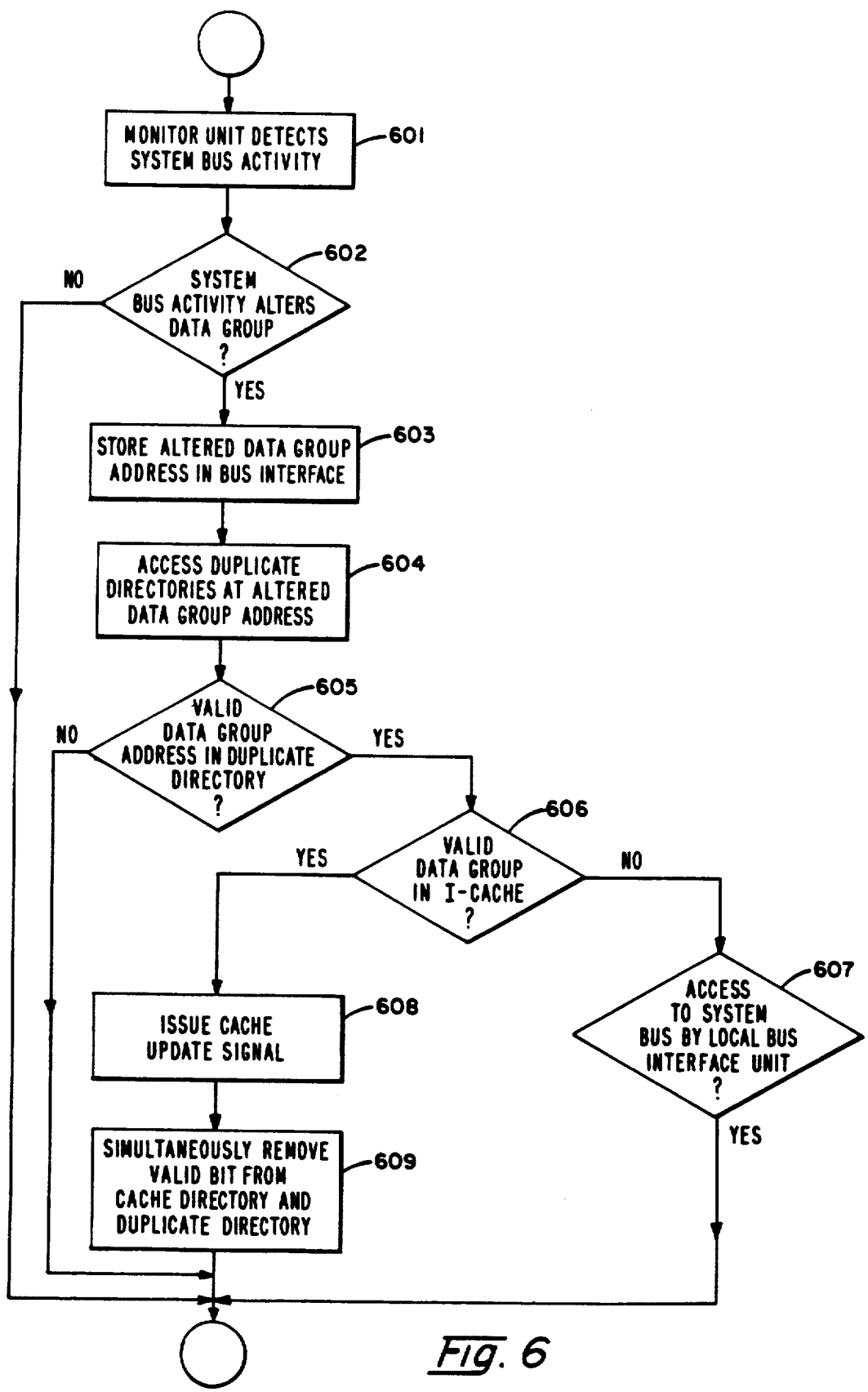
FIG. 6 is a flow diagram for the operation of the coherency apparatus for signals transferred over the system bus.

Referring next to FIG. 6, the operation of the coherency apparatus of the present invention is illustrated for data groups transferred on the system bus. In step 601, system bus activity is detected by the monitor unit 7-106. The nature of the system bus activity is determined by the monitor unit in step 602. When the bus activity is of such a nature that a data group is not altered, then no further activity is required by the coherency apparatus. When the system bus activity is of such a nature as to indicate a change in an instruction or operand data group, the address of the instruction or operand data group is stored in the bus interface unit 7 in step 603. In the preferred embodiment, most of the signals on the system bus activity are transferred temporarily to the bus interface unit 7 prior to a determination of a requirement by the associated data processing unit. The address data group associated with the instruction or operand data group being altered is stored temporarily in the address data buffer register 7-104 and is processed based on signals from the monitor unit 7-106. The monitor unit 7-106 accesses either the I-cache duplicate directory or the E-cache duplicate directory with an address data group from the address data buffer register 7-104 in step 604. A determination is made in this duplicate directory whether the address data group of the changed instruction or operand data group is present and whether the valid bit is present therewith in step 605. When the address data group is not present and/or the valid bit is not set in the duplicate directory, the coherency apparatus is not needed. When a valid address is detected, a determination is made whether the valid address data group is stored in the I-cache duplicate directory 7-107 or is stored in the E-cache duplicate directory 7-108 in step 606. When the valid address data group is stored in the E-cache duplicate directory 7-108, a determination is made whether the memory reference originates from the data processing unit of which the monitor unit 7-106 is a part in step 607. When the data group having a valid address in the E-cache duplicate directory 7-108 originates from the local data processing unit, then the coherency apparatus is no longer needed. When the valid data group is stored in the I-cache duplicate directory 7-107 or when the associated data processing unit did not issue the memory reference instruction having a valid address stored in the E-cache unit 6-4, then the monitor unit 7-106 issues a cache update signal in step 608. In the next machine cycle, the valid bit associated with the data group address is removed from the duplicate directory and the cache directory in step 609. The steps of FIG. 6 are arranged to illustrate the procedure, but it will be understood that the operation of the apparatus can be slightly different while achieving the same result. For example, the decision as to whether the valid address is in the I-cache unit is performed by identification of the valid address in the I-cache unit and not as a separate step.

Figure 7:
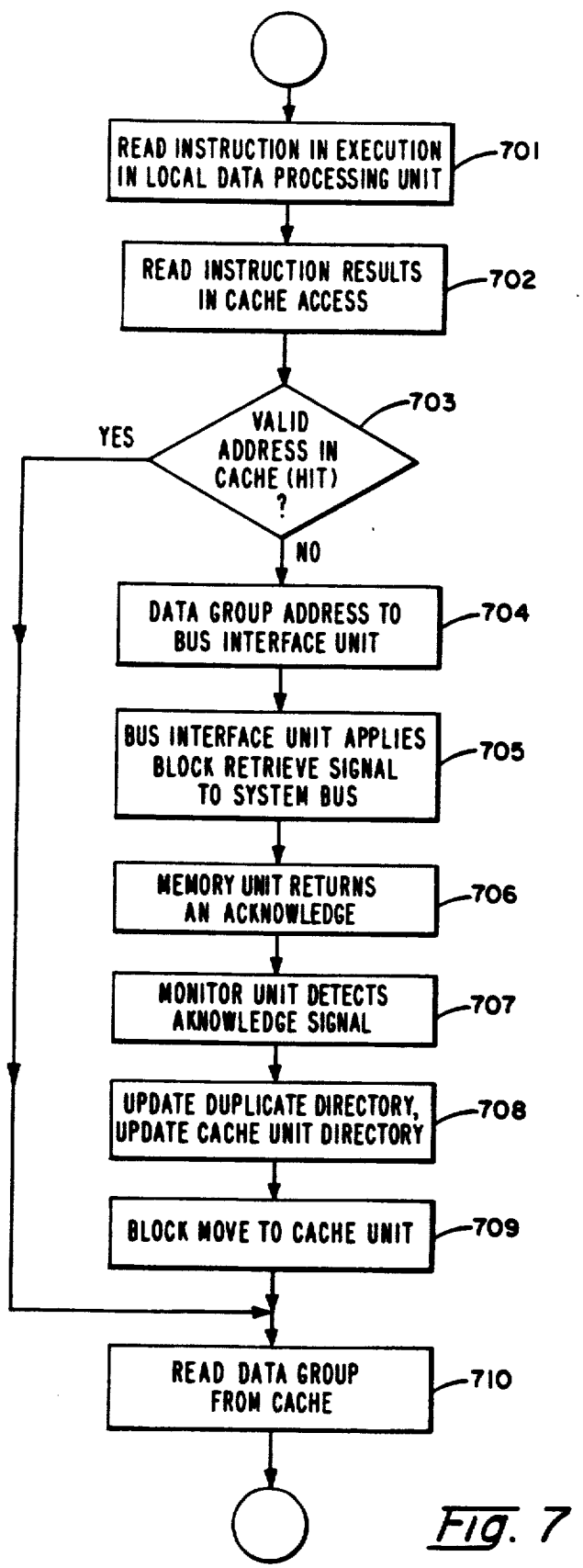
FIG. 7 is a flow diagram for the operation of the coherency apparatus during a block move operation.

Referring to FIG. 7, the operation of the coherency apparatus for the block read data operation is illustrated. The data processing unit is executing a read instruction in step 701. In step 702, the read instruction accesses the appropriate cache memory unit. As a result of the cache unit access, a determination is made whether the required instruction or operand data group is in the cache unit, i.e., a "cache hit" in step 703. When the data group is in the cache unit, the instruction or operand data group is retrieved in step 709. When the instruction or operand data group is not in the cache unit in step 703, a "cache miss" is identified and the address data group of the instruction or operand data group is forwarded to the bus interface unit 7 in order to retrieve the required data group from the memory unit 8 as a block of data groups. The address data group in the bus interface unit 7 is also used to address the appropriate duplicate cache directory location. In the preferred embodiment, a separate subbus 12-104 of the system bus 12 is devoted to block data moves in order to increase the processing capability of the data processing system by increasing the availability of required data groups. When the bus interface unit 7 acquires access to the system bus 12 to communicate to the memory unit 8 the request for the block of data groups, the memory unit 8 transmits an ACKNOWLEDGE signal indicating the receipt of the request. The monitor unit 7-106, upon receipt of the ACKNOWLEDGE signal in step 706, stores a valid signal in the duplicate cache directory at the location determined by the address forwarded to the bus interface unit and forwards an cache update signal to the cache unit in which the "miss" occurred, resulting in a valid signal being set in the cache directory unit in step 707. The block of data groups are forwarded from the memory unit 8 to the bus interface unit to the cache unit in step 708 and the required data group is transferred to the execution unit in step 709.

2. Operation of the Preferred Embodiment

When an instruction or operand data group is changed by a data processing unit, the other copies of the data group in the data processing system must be invalidated or correspondingly altered. In the preferred embodiment of the present invention, a store through mode of operation is employed to insure that the memory unit 8 has a latest copy of the instruction or operand data group. Because of this mode of operation, a changed data group is always applied to the system bus 12. In addition, if the address of the data group from the associated central processing unit is stored in the E-cache unit, then the new data group replaces the previous data group in the E-cache unit. The monitor unit 7-106, therefore, has access to all data groups for which a compromise in coherency with other data groups in the data processing system can occur. The monitor unit 7-106 can identify the memory reference (write) command and can obtain the address of the data group being stored in the memory unit. The monitor unit 7-106 can determine when the address of the data group to be stored in the memory unit 8 is present in the duplicate directory. When the address is present in the duplicate directory and if the valid bit is present, then the data group must be invalidated. In the preferred embodiment, access is gained to the cache directory unit and the invalidation of the cache directory address (and associated instruction or operand) and the duplicate cache directory address are performed simultaneously, thereby preventing data group incoherencies.

When a data group is not present in the cache memory unit or the location containing the address of the requested data group is designated as not being valid, then the requested data group must be retrieved from the memory unit 8 and transferred to the requesting unit as soon as possible. In the preferred, embodiment, the block read data bus 12-104 is provided to expedite the transfer of the data group(s) to the requesting unit. In addition, the bus interface unit 7 has the block read data buffer register 7-105 to minimize the duration of the data group in the bus interface unit 7. Because the monitor unit 7-106 recognizes that a memory read is being performed and that the requesting data processing unit is the data processing unit which includes the monitor unit 7-106, the monitor unit accesses the related duplicate directory and stores the address in the duplicate directory. When the ACKNOWLEDGE signal indicates that the main memory is preparing to transfer the requested data group(s), a valid signal is applied to the location storing the address of the related signal groups(s). (Because an interruption resulting from cache "misses" can impact the performance of the data processing unit and because related data groups are typically stored in contiguous addresses, each cache "miss" results in a transfer of a plurality of data groups or block of data groups. The block read data buffer register is adapted to expedite transfer of the block of data groups into the cache storage unit.)

In the preferred embodiment, when an operand data group associated with the execution unit is transferred to the main memory, then the valid bit is removed from the address of the data group in the duplicate directory when the address is present in the duplicate directory only for memory writes from other data processing units. When an instruction data group associated with the instruction unit is transferred to the main memory unit, all copies of the instruction address are invalidated, including the address in the I-cache unit associated with the data processing unit transferring the instruction data group to the memory unit 8.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing system having a plurality of tightly coupled data processing units, said data processing system comprising:
   a system bus;
   a memory unit coupled to said system bus;
   a plurality of data processing units coupled to said system bus, each data processing unit including:
      an instruction unit for retrieving and preparing instructions for execution;
      an instruction cache unit for storing instructions to be executed by said data processing unit, said instruction cache unit having an instruction directory, each location of said instruction directory storing an address and a valid/invalid signal for a related instruction stored in said instruction cache unit;
      an execution unit responsive to said instruction unit for operating on operands;
      an execution cache unit for storing said operands, said execution cache unit having an execution directory, each location of said execution directory storing an address and a valid/invalid signal of a related operand stored in said execution cache unit; and
      an interface unit coupled to said system bus for asynchronous exchange of signals therewith, said interface unit coupled to said instruction cache unit and said execution cache unit for retrieving instructions and operands required by said data processing unit for execution of a program when not stored in said instruction cache memory unit or said execution cache unit, said interface unit having:
         an instruction cache duplicate directory duplicating address and valid/invalid signals stored in said instruction directory,
         an execution cache duplicate directory duplicating address and valid/invalid signals stored in said execution directly, and
         monitor means responsive to signals transmitted on said system but for storing an invalid signal in directories and duplicate directories in a data processing system when an address stored in said directories and duplicate directories is applied to said system bus in association with a store operation into said memory unit by a data processing unit not having said monitor unit.

2. The data processing system of claim 1 wherein said instruction cache units and said execution cache units are implemented using store through caching strategies, wherein conditions for applying invalid signals to said execution cache and execution cache duplicate directories can differ from conditions for applying invalid signals to said instruction cache and instruction cache duplicate directories.

3. The data processing unit of claim 1 wherein said monitor unit applies an invalid signal in directories and duplicate directories storing an address applied to said system bus resulting from an instruction memory store operation.

4. The data processing unit of claim 1 wherein said interface unit includes a buffer register for transferring blocks of instructions from said system bus to said instruction cache unit and for transferring blocks of operands from said system bus to said execution cache unit.

5. The data processing system of claim 4 wherein said monitor means stores an address and a valid signal in said instruction duplicate directory when a block of instructions are transferred to said instruction cache unit and wherein said monitor unit stores an address and a valid signal in said execution duplicate directory when a block of operands is transferred to said execution unit, said address stored in a duplicate directory identifying data groups transferred to cache units.

6. The data processing unit of claim 5 wherein said valid signal is stored in said directory and duplicate directory when said memory unit acknowledges receipt of control signals and an associated address for a transfer of a block of data groups.

7. Coherency apparatus in a bus oriented data processing system having a plurality of data processing units coupled to said system bus and a main memory unit coupled to a system bus, wherein interaction between said data processing units and said memory unit is over said system bus is asynchronous, said data processing units using a store through protocol wherein said main memory unit stores a correct version of a signal group, each of said data processing units including an instruction cache memory unit having an instruction cache directory and an execution cache memory unit having an execution cache directory, said directories storing address identifying signal groups stored in said cache units, each address including a validity bit position indicating whether a stored signal group identified by said each address can be processed by said data processing unit, wherein each data processing unit includes said coherency apparatus, said coherency apparatus comprising:
    monitor means for monitoring address and control signals on said system bus;
    an instruction cache duplicate directory storing signals duplicating signals in said instruction cache directory;
    an execution cache duplicate directory duplicating signals stored in said execution cache directory, wherein said monitor means determines when a signal is to be removed form validity bit positions in said instruction cache and instruction cache duplicate directories and in said execution cache and execution cache duplicate directories in response to addresses and control signals on said system bus, wherein removal of said signal from validity bit positions for said instruction cache and said instruction cache duplicate directories can be a result of different conditions compared to removal of said signal from validity bit positions for said execution cache and said execution cache duplicate directories.

8. The coherency apparatus of claim 7 wherein said monitor means removes said signal simultaneously from said valid bit positions in said instruction cache directory and said instruction duplicate directory for an address identifying a signal group in an instruction store to main memory unit operation.

9. The coherency apparatus of claim 7 wherein said monitor means removes said signal from a validity bit position in said execution cache directory and said execution duplicate directory at a location storing an address identifying an operand of an operand store to memory operation by a data processing unit of which said monitor means is not a component.

10. The coherency apparatus of claim 9 wherein a removal of a signal from a validity bit position in a cache directory and an associated cache duplicate directory occur substantially simultaneously.

11. The coherency apparatus of claim 7 wherein said monitor means includes apparatus for storing a signal in a validity bit position in said execution cache directory and said execution cache duplicate directory at an address identifying a block of data groups, said block of data groups including a data group required by said data processing unit to which said monitor means is coupled.

12. The coherency apparatus of claim 11 wherein signals are stored in said validity bit positions prior to transfer of said block of data groups to said execution cache unit.

13. The method for maintaining coherency in a data processing system having a plurality of data processing units coupled asynchronously to a system bus, wherein said data processing units are tightly coupled to a memory unit, each data processing unit including an execution unit with an associated execution cache unit and an instruction unit associated with an instruction cache unit, each cache unit including a directory unit for storing an address identifying data groups stored in said associated cache unit and a validity bit position associated with each stored address, wherein each data processing unit includes a bus interface unit for synchronizing signals on said system bus with signals in said data processing unit, said method comprising:
    in each data processing unit, storing addresses and signals stored in associated validity bit positions in an instruction duplicate cache directory and in an execution duplicate cache directory substantially identical to addresses and validity position signals stored in said instruction cache directory and said execution cache directory respectively;
    monitoring transactions on said system bus by processing signals transmitted thereon;
    removing a validity signal form said instruction cache directory and said instruction cache duplicate directory at a cache location associated with a selected address in response to a first set of conditions when a data group having said selected address is being stored in said memory unit; and
    removing a validity signal from said execution cache directory and said execution cache duplicate directory at a cache location associated with a selected address in response to a second set of conditions when a data group having said selected address is being stored in said memory unit.

14. The method for maintaining coherency of claim 13 further comprising the step of removing a signal from a validity bit position from said execution cache directory and said execution duplicate cache directory at a selected address when a data group identified by said selected address is applied to said system bus for storage by said memory unit by a data processing unit not having said execution cache unit and said execution duplicate cache directory.

15. The method for maintaining coherency of claim 14 further comprising the step of storing a signal in validity bit positions in a one of said cache directories and an associated duplicate cache directory at an address determined by a cache "miss" in said cache directory.

16. The method for maintaining coherency of claim 15 wherein said storing step is executed in response to an ACKNOWLEDGE signal from said memory unit in response to a block read command from said data processing unit having said one cache directory.

17. The method for maintaining coherency of claim 14 wherein said monitoring step includes the step of identifying commands transferred on said bus.

18. The method for maintaining coherency of claim 14 further comprising the step of entering substantially all addresses on said system bus in said bus interface unit, said monitoring step determining which addresses are to be stored in said bus interface unit.

19. The method for maintaining coherency of claim 18 further comprising the step of applying addresses stored in said bus interface unit to said duplicate directories.

20. The method for maintaining coherency of claim 19 further comprising the step of applying said stored address to said cache directories, wherein a presence of a stored address in a duplicate directory causes said associated cache directory to have signal removed from a validity bit position.

* * * * *